(12) United States Patent
Rohatschek et al.

(10) Patent No.: US 8,885,645 B2
(45) Date of Patent: Nov. 11, 2014

(54) METHOD FOR TRANSMITTING DATA

(75) Inventors: Andreas-Juergen Rohatschek, Wernau/Neckar (DE); Bernd Lutz, Horb (DE); Dieter Thoss, Schwieberdingen (DE); Thorsten Huck, Freiberg (DE); Stoyan Todorov, Mannheim (DE)

(73) Assignee: Robert Bosch GmbH, Stuttgart (DE)

( * ) Notice: Subject to any disclaimer, the term of this patent is extended or adjusted under 35 U.S.C. 154(b) by 123 days.

(21) Appl. No.: 13/245,311

(22) Filed: Sep. 26, 2011

(65) Prior Publication Data
US 2012/0076146 A1 Mar. 29, 2012

(30) Foreign Application Priority Data

Sep. 27, 2010 (DE) .......................... 10 2010 041 427

(51) Int. Cl.
*H04L 12/423* (2006.01)
*H04L 25/49* (2006.01)
*H04L 29/12* (2006.01)
*H04L 12/43* (2006.01)
*H04L 12/42* (2006.01)

(52) U.S. Cl.
CPC ...... *H04L 12/423* (2013.01); *G06F 2213/0038* (2013.01); *H04L 25/49* (2013.01); *H04L 61/2038* (2013.01); *H04L 12/43* (2013.01); *H04L 25/4904* (2013.01); *H04L 12/422* (2013.01)
USPC .......................................................... 370/392

(58) Field of Classification Search
None
See application file for complete search history.

(56) References Cited

U.S. PATENT DOCUMENTS

| | | | | |
|---|---|---|---|---|
| 6,490,641 | B2 * | 12/2002 | Whetsel | 710/104 |
| 2009/0180483 | A1 * | 7/2009 | Przybylski | 370/400 |
| 2009/0210596 | A1 * | 8/2009 | Furuya | 710/110 |
| 2012/0297233 | A1 * | 11/2012 | Ross | 713/502 |

FOREIGN PATENT DOCUMENTS

| | | | | |
|---|---|---|---|---|
| DE | 37 88 604 | | 6/1994 | |
| DE | 198 03 686 | | 8/1999 | |
| EP | 0258604 | B1 * | 7/1987 | ............. H04L 12/28 |
| EP | 0629066 | B1 * | 1/2003 | ............. H04L 25/49 |
| GB | 2 188 216 | | 9/1987 | |

OTHER PUBLICATIONS

Beuth, et al. : Nachrichtentechnik, Elektronik 7, 3, Auflage, Wuerzburg : Volgel Industrie median GmbH&Co. Kg. 2009. Titelblatt + Impressum + Seiten 236-237. ISBN 978-3-8343-3108-3.

* cited by examiner

*Primary Examiner* — Chi Pham
*Assistant Examiner* — Kouroush Mohebbi
(74) *Attorney, Agent, or Firm* — Kenyon & Kenyon LLP

(57) ABSTRACT

A method is described for transmitting data between participants of a serial, ring-shaped communications arrangement in which the participants are serially connected to one another, wherein a data packet is passed from a participant provided as a master to further participants provided as slaves, wherein the data packet is passed from slave to slave, and wherein address information of the data packet is altered by each slave.

7 Claims, 3 Drawing Sheets

METHOD FOR TRANSMITTING DATA

RELATED APPLICATION INFORMATION

The present application claims priority to and the benefit of German patent application no. 10 2010 041 427.1, which was filed in Germany on Sep. 27, 2010, the disclosure of which is incorporated herein by reference.

FIELD OF THE INVENTION

The present invention relates to a method for transmitting data between participants of a communications arrangement, and to a communications arrangement.

BACKGROUND INFORMATION

In many networks, more often serial interfaces are used instead of parallel interfaces. The reasons for this are the reduction in costs for the layout and connection technology, for example the number of pins, simplification of the system design and scalability of the bandwidth of transmission data by parallel use of a plurality of serial interfaces.

This trend is becoming apparent particularly in the field of consumer electronics with a large number of serial interface standards. Those standards are used mostly for communication with peripheral devices, for example hard drives or displays. Apart from the small number of pins, however, those interfaces make use of complex protocols, which require high expenditure in terms of implementation. For data transmission between logic components (ICs), for example on the mainboard of a PC or within a handheld device, present-day interfaces bundle a plurality of serial data streams, for example PCI-Express or Quickpath, and thereby enable the system designer to scale the bandwidth.

In the automotive engineering sector, serial interfaces (SPI, serial peripheral interfaces) are used for data transmission between logic components, which may be in the form of integrated circuits (IC), in control units. That standard describes bidirectional, synchronous and serial data transmission between a component provided as a master and various components provided as slaves. An interface includes in this case at least three lines between the master and a slave, these normally being two data lines and a clock line. In the case of a plurality of slaves, each of those components requires an additional select line from the master. The SPI interface enables a daisy-chain or bus topology to be implemented.

In some cases, the SPI interface is not suitable for the transmission of time-critical actuation signals in order to meet the real-time requirements of present-day safety applications, for example ESP. Frequently, only an exchange of diagnostic and status information takes place with an SPI interface. Time-critical actuation signals are normally transmitted to the actuation components of the actuators and/or from the evaluation circuits of the sensors at great expense using timer units and/or proprietary interfaces.

When used in the form of a bus topology, at higher data rates the SPI interface gives rise to increasingly poorer signal integrities and high interference due to poor EMC characteristics. Furthermore, only the send signal is transmitted synchronously with the timing signal, whereas phase-synchronous transmission of the receive signal becomes increasingly more difficult as a result of the internal delay times in the slave at high data rates and may cause errors in the data transmission.

When the SPI interface is used in a daisy-chain topology, that is, a ring topology, very high latency times occur, which is why it is not possible for that form to be used efficiently in automotive control units nowadays.

A method for implementing communication in a ring bus is further known from British patent document GB 2 188 216 A. The communications sent between participants of the ring bus have what are commonly referred to as headers which comprise a plurality of digits indicating the availability of the ring bus. In addition, a shift register is provided whose maximum delay represents a number of bits in the header, a control device being able to manipulate data in the header of a message.

A method for transmitting a token in a communication ring is described in German patent document DE 37 88 604 T2. In that instance, a priority level of that token in a communication ring with a plurality of stations is updated. It is provided that each respective range corresponds to priority levels of packets that need to be transmitted by each respective station, the token of the communication ring being transmitted from a first station of the communication ring as soon as a first station transmits a frame containing a packet that is to be transmitted.

There are known from German patent document DE 198 03 686 A1 a method and an apparatus for communication among, for example, equal-access stations of a ring-shaped, serial fiber-optical bus. In that instance, time-cyclical container telegrams are generated, addressed and provided to the serial bus by the stations.

SUMMARY OF THE INVENTION

Against that background, a method and a communications arrangement having the features of the independent patent claims are presented. Further embodiments of the present invention will be apparent from the dependent patent claims and from the detailed description.

In the method, a serial connection is made of participants and hence of nodes of a serial communications arrangement of ring-shaped configuration. In that arrangement, data transmission may take place from participant to participant with a delay of at least one bit duration, whereby data packets, which may contain messages, may be transmitted between the participants with very little latency. The described communications arrangement is formed in embodiment as a synchronous, bidirectional communications system or synchronous, bidirectional communications arrangement, exchange of data taking place through a ring topology which is provided for an embodiment of the communications arrangement. There is transmitted with a data signal or with a signal at least one data packet which includes timing information. The communications arrangement corresponds in an embodiment to a ring-shaped network in which the participants may be serially connected to one another in a ring shape. Such a communications arrangement may also be referred to as a ring.

In that arrangement, uniform addresses may be allocated for all participants, for example "00 . . . 0", that is to say, no configuration of the slaves is necessary. Each slave modifies, for example subtracts or adds, a fixed value from or to an address value of a received data frame that includes a message. Usually, the position of all participants within the communications arrangement provided as slaves needs to be known only to the participant provided as a master.

In one embodiment of the present invention, it may be provided that transmission of a system time to an interface of the communications arrangement is performed by continuous data transmission, that is, continuous synchronization, by a timing recovery module in the slaves. In addition, after a fixed number of data bits, stuffing bits may be inserted, thereby making it possible to ensure timing recovery in the slaves.

Instead of the stuffing bits, which serve only for timing recovery, bits for checking parity may also be inserted. A suitable choice of parity bits makes it possible to ensure that at least one edge change is present in the bit stream within a specified period of time. Alternatively, other encoding methods from the related art may also be used for timing recovery.

The data frames or empty frames sent by the master and exchanged between the participants are separated from one another by a specific sequence of bits of what is commonly referred to as an inter-frame symbol. Since the data signal is typically transmitted in encoded form in order to make timing recovery possible, the inter-frame symbol typically corresponds to a special "illegal" signal which does not correspond to any data bit string. In a further embodiment, the inter-frame symbol may also be in the form of a series of zeros or ones. By measuring the inter-frame symbol, that is, in this case a period of time without an edge change, that period of time being dependent upon the number of zeros and/or ones, a slave is able to ascertain the speed of the data transmission and carry out a rough timing recovery. By inserting stuffing bits or parity bits, an edge change is brought about in the data packet after a given number of bits, thereby ensuring that exclusively the inter-frame symbol has the maximum length of zeros or ones and is therefore an unambiguous bit string for synchronization purposes.

Alternatively, an inter-frame symbol may also be any other bit string known to the slaves, which, for example, provides for spectral spreading in the frequency domain.

Using the inter-frame symbol it is possible to ascertain inter alia the polarity of the signal transmission. Thus, for example, the two lines between two participants may, in the case of differential transmission, be laid in accordance with an optimum configuration of the layout, for example in order to avoid crossings in the conductor track routing of the communications connections, and on the printed circuit board may be connected to the integrated circuits (ICs) with any desired polarity. It is advantageous that, with a suitable choice of encoding, for example by Miller encoding or modified frequency modulation, the recovery of the information is sensitive only to the time position of the edges, that is to say, is not level-sensitive, as a result of which the polarity of the data signal is in any case a matter of choice.

In order that information and/or interrupt requests may be received from the slaves when the master is idling, that is, when the master does not have any messages to send, the master continuously sends what are referred to as empty frames. By sending the empty frames, which are also referred to as idle frames, polling of the slaves therefore takes place. Each slave is able to use an empty frame and transmit its data and/or at least a request in the form of what is referred to as a "soft interrupt" and thus a software interrupt, for example of a second level interrupt handler (SLIH), that is, a control program for an interruption of a second layer in accordance with the OSI layer model, to the master as a response to the polling. In addition, the interface of the master may be automated to the extent that, by using suitable methods, the data directly received and/or the data to be retrieved at the slaves are written directly into the memory of the master.

The physical layer of the serial interface of a participant includes point-to-point connections in simplex mode, in which transfer of data takes place in one direction only. Those connections may be electrically asymmetrical, for example via CMOS level, electrically symmetrical, for example via differential LVDS signal transmission or also optical. Furthermore, transmission may also be carried out with the aid of a modulation method, for example for multiple use of signal and/or supply lines.

In further embodiment, the method permits the regeneration of the signal in each slave, so that the signal only has to cross a short distance in each case. In that manner, the technical expenditure is additionally reduced despite the high transfer rate.

Furthermore, the method typically allows any desired number of slaves to be connected to the arrangement. The number of slaves is limited by the address space and thus by the size of the address field. The adding of further slaves has no effect on the electrical characteristics, for example signal quality, or the EMC behavior, in other words the electromagnetic compatibility of the communications arrangement.

The method makes it possible to ensure implicitly that all slaves are capable of operating for communication and supplying timing, at least with regard to their interface.

In advantageous embodiment, provision may be made for data transmission between a microcontroller and an application-specific integrated circuit (ASIC) within a device for a motor vehicle provided as an automotive control unit. A serial interface for at least one participant, which in this case corresponds to a device and/or is associated with such a device, is defined within the scope of the exemplary embodiments and/or exemplary methods of the present invention. With that interface, it is possible to carry out at least individual steps of the described method. Usually, the described communications arrangement and the described method may be used for devices and hence for participants in different electromechanical apparatuses if transmission of data is envisaged for them.

In an embodiment for a communications arrangement having, for example, a ring structure, an addressing concept for participants is provided by the exemplary embodiments and/or exemplary methods of the present invention, wherein when a data packet is forwarded from one participant to the next participant, a delay, of at least one bit duration, takes place.

It is thus possible to provide with the exemplary embodiments and/or exemplary methods of the present invention a communications arrangement and a method for serial data transmission between participants which may be in the form of logic components within a control unit. Participants are provided in the form of at least one discrete logic component (ASIC) as slaves, and one logic component (microcontroller) as master for the control, that is, for the closed-loop and/or open-loop control, of at least one slave. Simple and inexpensive implementation in logic components, that is, microcontrollers and/or ASICs, with high data rates is made possible, it being possible to achieve such implementation using few connection lines on a printed circuit board and with few pins of the logic component, that is to say with low costs in terms of layout and connection technology. Furthermore, the method is able to make possible the transmission of higher data rates than in the case of the SPI interface typical for automotive applications. The timing signal encoded in the data signal guarantees phase-synchronous transmission independently of the line routing and the delay times.

The participants are usually arranged in the communications arrangement in the form of a ring topology, whereby it is possible for the participants to be connected by point-to-point connections using a minimal number of pins. In a ring topology, the slowest participant determines the bus speed. Where appropriate, combination or grouping of participants in different rings may be performed, in which case an embodiment of the method according to the present invention may be carried out in each of those rings as a self-contained embodiment of a communications arrangement according to the present invention. If a plurality of functional groups are integrated in one control unit, for example if a microcontroller communicates with at least one ASIC of different functional units, each of the respective functional groups typically makes use of a separate ring arrangement.

The microcontroller normally acts as the master, as a result of which no bus arbitration is required. Thus, in accordance with the present-day SPI protocol, which is also a master-slave concept, the master is able to cyclically interrogate the slaves by what is commonly referred to as polling.

In accordance with the SPI standard, it is possible for synchronous data transmission to take place. No separate lines are required, however, for data and timing. The interface provided provides for encoded transmission of the timing within the data signal, for example 8B/10B encoding, Manchester encoding or Miller encoding, that is to say, modified frequency modulation. Consequently, for low data rates only two pins are provided per participant, with one line to the preceding participant and one line to the subsequent participant. High data rates provide for differential transmission with four pins per participant, with two lines to the preceding participant and two lines to the subsequent participant. Apart from providing a reduction in costs, encoded transmission of the timing information may also make it possible for no delays to occur between timing and data over a transmission path between the participants. A system time is specified by the master and all slaves synchronize themselves using their own, local timing recovery modules, for example by a phase-control loop or by oversampling with corresponding synchronization with the message signal.

During initialization at the beginning of a transmission, starting from a first interface, from which data packets are sent, the master sends a synchronization signal to the first slave in the communications arrangement configured, for example, as a ring. As soon as the system time of the first slave, that is, the receiver, is in phase with the master, forwarding of the synchronization signal to the next slave begins. In this operation, passing of data packets between interfaces of adjacent participants takes place. That procedure continues throughout the entire communications arrangement. Once synchronization of all the slaves in the communications arrangement configured, for example, as a ring has taken place, a receiver in the master, usually a second interface with which data packets are received, may also be adapted. Owing to the delay, unknown in the master, upon transmission of data frames or empty frames through the ring and owing to the associated phase offset from its own system time, in a last step of the initialization procedure phase correction is carried out also in the master. Once the phase in the receiver of the master has also been corrected, all of the participants are in phase and are then able to transmit data packets synchronously.

To avoid frequency fluctuations of the timing recovery modules in the slaves due to constant re-synchronization, continuous transmission of data and hence of data packets in what is referred to as continuous mode may be employed. That first of all eliminates the backlog for synchronization patterns at the beginning of a data packet which is required in the case of packet-oriented transmission (so-called burst transmission mode) as opposed to continuous transmission (so-called continuous transmission mode). Owing to the possibility of continuous synchronization, the slaves also do not require any further system time as generally has to be additionally supplied besides the communications interface in the case of known systems. Consequently, a saving may be made in further lines and pins. Continuous mode optionally provides for the use of a spread-spectrum technique, in other words a spectral spreading for improvement of the EMC characteristics. Furthermore, use of packet-oriented transmission (so-called burst transmission mode) is also possible, although that possibly necessitates an additional line for transmission of the system time from the master to the slaves.

In further embodiment, the participants participating in the communication have shift registers. Automatic timing of the shift registers occurs in this case, it being possible by using a timing recovery module to recover a timing for the time base of the master provided as a microcontroller. The shift register automatically transmits the data with a timing signal of that timing. Since the bits may be processed individually, it is possible to achieve the minimum latency time of one bit duration per participant. Latency times, which occur until a data packet with a message has been transmitted through the ring, are therefore small, thereby making it possible to ensure the real-time capability of the communications arrangement. Owing to the minimal delay of the message by at least one clock cycle, signal conditioning, that is to say, bit-reshaping, which may have a level-related and/or time-related effect, also takes place in each participant.

Within the scope of the exemplary embodiments and/or exemplary methods of the present invention, addressing of the participants is carried out not by way of a separate select signal, but by addressing within a data packet in the form of a data frame or an empty frame. In order for the address field to be detected in the continuous data stream, the inter-frame symbol, which corresponds in form to a start symbol and an end symbol of a data packet, is inserted.

The inter-frame symbol may also be regarded as the preamble of a data frame, with which the slaves are able to synchronize themselves with the forthcoming data. In that manner, a synchronization of the frame takes place, since every participant knows that data are always transmitted after the inter-frame symbol. The inter-frame symbol may also be used to implement variable data lengths.

The master may address the slaves by the addressing procedure and may write or read data by using appropriate commands. By using a reservation flag, that is to say, a bit value, it is possible to signal directly after the inter-frame symbol whether the frame is occupied by useful data and only the participant addressed is allowed to process the data frame. That dedicated bit is usually referred to as a reservation flag, that reservation flag signaling whether the data packet contains a data frame or an empty frame.

In one possible embodiment of the present invention, each slave adds or subtracts a fixed value to or from an address value of the address of a received data packet. In that operation, on addressing of a participant, the ring topology of the communications arrangement, which may be provided as a ring-shaped network, is used in such a way that each participant adds or subtracts "1" to or from the current address, whereby in the case of an address "000 . . . 0" containing only zeros a desired participant may be addressed. In one embodiment of the method, all the participants, usually all the slaves, are sensitive to an identical address. That subtraction or addition typically takes place only when the data frame contains useful data, that is to say, when the reservation flag after the inter-frame symbol has been set. This is usually implemented by a 1-bit subtractor by transmitting the address LSB-First, that is, the address of the first least significant bit.

If an address value of a received address is "000 . . . 0", the data that follow are intended for the current slave and are processed by it. In addition, by the described procedure, that is, subtraction by "1", the address value of the address field in the data frame is automatically set by an overflow to "111 . . . 1", which ensures that that data packet is passed on as a message as far as the master and, for example, may contain an acknowledge of the correct receipt of the message or directly a response. That data packet is forwarded to the next participant within the communications arrangement. In that operation, a modification, for example a subtraction or addition, is carried out for the re-set address value by all subsequent slaves. By automatic setting of the address value in the address field of the data frame to the highest value in the slave, the master is able to trace which slave the message was sent from since, owing to the structure of the address value, the master is able to trace how many modifications or alterations were carried out for the set address value, the number of modifications carried out corresponding to the number of slaves that have received and forwarded the data packet after setting of the address value by a slave.

Using the described interface, it is possible to switch between different frame lengths. If a fixed frame length is selected, small data packets may sometimes be transmitted in a large frame. In that case, padding of the data frame with dummy data is necessary. It is equally possible to implement a variable frame length, in which case the length of the shift registers in the slaves may be independent of one another since the irrelevant data frames are merely passed on in each case.

In the case of variable frame lengths, by using an empty frame the slaves are able to signal to the master a request that useful data are to be transmitted from the slave, after which those data are then fetched by the master by sending a data frame of appropriate length.

If data are to be passed from the slave to the master without a request from the master, the slave is able to fill an empty frame sent by the master. For this, a bit after the inter-frame symbol, a so-called reservation flag, is set. The address value in the address field of the data frame is usually set by the slave filling the empty frame to the highest value ("111 . . . 1"). This can be done in such a way that the address value in the empty frame is set by the slave to "111 . . . 1" and is communicated to the master by subtraction or addition of the address in the address field of the data frame in each slave. Setting of the address to the value "111 . . . 1" may be carried out, for example, by an OR operation by overwriting all the address bits with a "1". In that case also, the master is able to trace, on the basis of the number of modifications of the address field carried out by slaves, which slave has filled the empty frame and re set the address value for the address field. With that form of implementation, on being sent by the master the address field in the data frame or empty frame may contain random data, whereby spectral spreading may take place and hence better EMC characteristics may be obtained. In a further embodiment of the interface, an empty frame may also contain a useful data field, which enables a slave to directly transmit data not exceeding the data length specified by the empty frame.

If the configuration of the empty frames does not contain a useful data field, the slave is only able to send an interrupt, for example a soft interrupt, to the master and wait for the master to send a suitable data frame to the slave in the next cycle. That data frame is provided with a set reservation flag and the address of the slave. The contents of the data frame may then include, for example, once more the command to read out a register, after which the slave subsequently copies the available information into the data frame or, especially, into the empty frame. If, however, an empty frame has a useful data field, the slave is able directly to attach the data to be transmitted, provided that the data do not exceed the length of the data field of the empty frame.

In order to trigger signaling in the case of this variant of the communication, prioritization of a slave is carried out on the basis of the position of the slave in the communications arrangement. In one configuration of the interface, a slave is able to communicate signaling to the master by setting a bit that has been allocated to it. Hence, this constraint may, however, lead to severe restrictions in terms of the layout of the printed circuit board. To avoid this, according to the number of slaves as participants in the communications arrangement, a number of bits that is at least as great as the number of participants, normally the number of slaves, in the communications arrangement that are capable of triggering an interrupt follows the inter-frame symbol and the reservation flag. Participants that only receive data from the master and do not supply messages to it, therefore, do not have an interrupt capability and consequently they ignore the empty frames. Accordingly, for this type of participant, it is also not necessary for an interrupt bit to be provided in the empty frame. If an interrupt is to be triggered by an interrupt-capable participant, that participant sets the bit that has been allocated to it. Prioritization of the handling of the interrupt may then be carried out in the master (microcontroller).

A variant in which allocation of a fixed bit is provided requires knowledge in the slave of its position in the communications arrangement and/or knowledge of a bit allocated to it in an empty frame. In another configuration of the interface, no fixed bit is allocated to a slave. Instead, the bit string of the empty frame after the reservation flag is shifted by one position by each slave and a new bit is inserted. In this instance, the information of the last bit is lost in each case. That does not represent a limitation, however, since at the beginning of the transmission, that is to say, the sending of the empty frame by the master, an empty frame does not carry any information and the number of bits provided therein is at least as great as the number of slaves of the communications arrangement that are capable of dispatching an interrupt request. If an interrupt request or an indicator for forthcoming data is to be triggered, the bit inserted by the slave may be set. Thus, an identical algorithm is stored in every slave and, by knowledge of the position of the participants in the communications arrangement, the master is able to attribute the interrupt requests accordingly and process them in accordance with the desired prioritization.

In a further configuration, it is possible for error correction also to be added. If a communications arrangement is configured in a ring shape, by virtue of the ring topology it may be laid out in such a manner that, after the transmission through the ring, the master compares the received message with the message that it originally sent and is thus able to deduce whether a transmission was error-free or contained errors. As a rule, the response to a request is sent by the slaves directly to the master in order to afford better capacity utilization of the system. Alternatively, the slave may respond only with the next data packet addressed to it, as corresponds to present-day configurations of an SPI communication. Optionally, a cyclic redundancy check (CRC) may be carried out as a checksum process or a parity check in the data frame may be added and the receiving participant provides an acknowledge at the end of its response. In addition, it is optionally possible to add parity bits also to the address field of the data frame.

If desired, transmission of the data may be carried out in such a manner that a message with data, which is usually provided in a data frame and transmitted completely through the ring starting with the sender, that is, the master, is decoded again in the master before the next data frame is sent. Alternatively, a continuous bit stream of data may be chosen, that is to say, sending of the next data frame takes place directly afterward rather than only after the previous message has been received. In this case, it is ensured in the protocol by arbitration that a soft interrupt of a slave is handled correctly in the event of overlapping addressing by the master, that is to say, when the master addresses the slave before the soft interrupt of the slave has been processed. That scenario is permissible and has no effect on the configuration of the described bit transmission layer.

In the case of the continuous data stream, the length of the inter-frame symbol may also correspond, for example, to the number of participants, normally the number of slaves, of a communications arrangement provided as a ring shape. Owing to the delay per participant of typically one bit duration, the duration of the transmission through the ring then corresponds exactly to the transmission time of an inter-frame symbol. The length of the inter-frame symbol or the time duration of the sending of the inter-frame symbol is thus selected according to the delay time of the transmission through the ring. Accordingly, a continuous data stream is provided, which, for example, has a positive effect on the synchronization of the slaves. At the same time, the master is able to decode the message that is in circulation before sending the next data frame. Accordingly, a rapid reaction to incoming soft interrupts is possible, and no overlap occurs between the dispatching of an interrupt request by the slave and reaction to a request by the master.

Optionally, an additional logic module is implemented in the master in order to write received data, for example sensor data, directly into a memory. In addition, the polling of the slaves may be automated. That results in a reduction in software interaction, which relieves the burden on the central processing unit (CPU). In addition, the registers of the ASICs (slaves) may be filed transparently in the memory of the microcontroller (master). Possible HW modules are known from the related art in the form of DMA, transfer units or also message boxes.

In addition to the spread-spectrum techniques already mentioned, there is the option of using a block-synchronized scrambler. In the case of the block-synchronized scrambler, the same m-sequence is simultaneously modulo-2-added to the data in the sending and receiving participants.

An interface provided within the scope of the present invention for a participant may be used for applications in the automotive sector. In conformity with the known standards such as IIC (inter-integrated circuit) and SPI (serial peripheral interface), the mentioned interface may also be used universally and accordingly is not restricted to use in the automotive sector or even in control units (ECUs).

The communications arrangement according to the present invention is configured to carry out all the steps of the method presented. It is also possible for individual steps of that method to be carried out by individual components, usually by participants, of the communications arrangement. In addition, functions of the communications arrangement or functions of individual components of the communications arrangement may be implemented as steps of the method. Furthermore, it is possible for steps of the method to be implemented as functions of at least one component of the communications arrangement or of the entire communications arrangement.

Further advantages and embodiments of the exemplary embodiments and/or exemplary methods of the present invention will be apparent from the detailed description and the accompanying drawings.

It will be appreciated that the features mentioned above and the features yet to be described hereinafter may be used not only in the respective combination indicated but also in other combinations or in isolation, without departing from the scope of the present invention.

DETAILED DESCRIPTION

The present invention is illustrated schematically in the drawings with reference to embodiments and will be described in detail hereinafter with reference to the drawings.

The Figures are described in a continuous and overlapping manner; identical reference numerals denote identical components.

Figure 1:
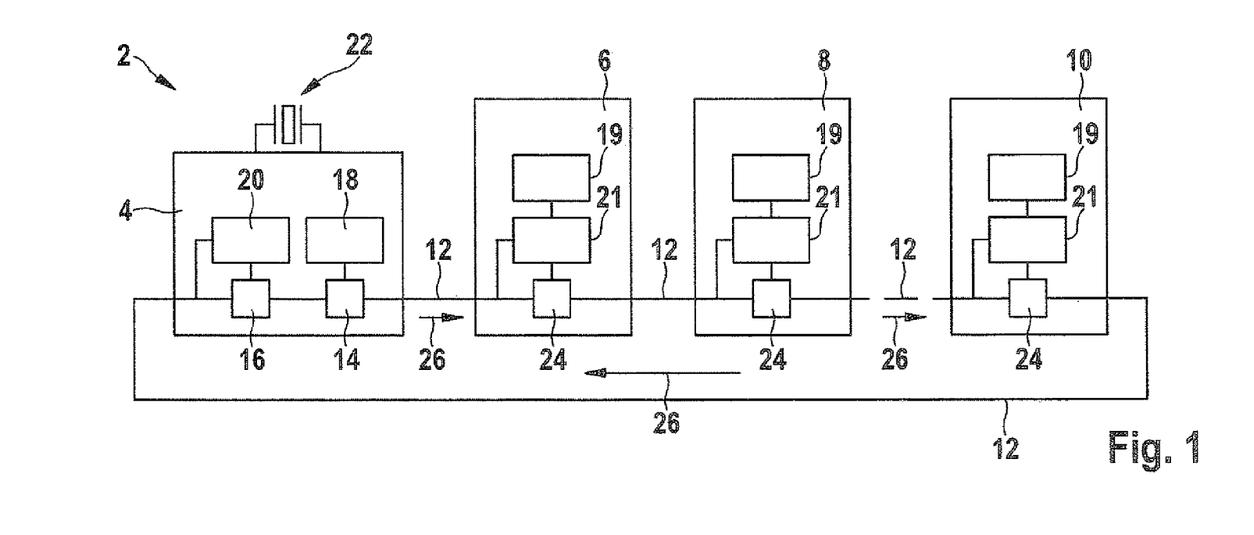
FIG. 1 shows a schematic illustration of an embodiment of a communications arrangement according to the present invention.

The embodiment of a communications arrangement 2 illustrated schematically in FIG. 1 is of a ring-shaped configuration and includes a plurality of participants connected in series, namely a master 4, a first slave 6, a second slave 8 and an n-th slave 10 connected to one another by sections 12 of a line. The master further includes a first digital serial interface 14 for sending data packets, with which master 4 is connected, depending on definition, to a beginning or an end of the line. In addition, master 4 includes a second digital serial interface 16 for receiving data packets, with which master 4 is connected, depending on definition, to a beginning or an end of the line. Serial first interface 14 is connected in this case to a system clock 18. Serial second interface 16 is connected to a module for detection of phase position 20 (commonly referred to as a delay locked loop). Furthermore, only master 4 is connected to a quartz oscillator 22.

Each of slaves 6, 8, 10 has a digital serial interface provided as a slave interface 24, each of which interfaces is connected to two connections 12 and hence to one data line. Thus, a connection exists between two participants. In addition, each serial slave interface 24 is connected to a timing recovery module 21 from which a local system time 19 may be derived.

To provide communication between the participants of communications arrangement 2, in one embodiment of the invention it is provided that, starting at a start interface 14 of master 4, messages are continuously transmitted as data packets via a bit stream 26 from serial slave interface 24 to serial slave interface 24 of slaves 6, 8, 10. When a data packet has reached a last slave 6, 8, 10, in this case the n-th slave 10, the data packet is passed from slave interface 24 of last slave 10 to end interface 16 of master 4.

In the case of communications arrangement 2 in a ring topology, a plurality of slaves 6, 8, 10, in this case ASICs, with an identical local address are each serially connected via digital slave interface 24 to master 4 which in this case is in the form of a microcontroller. In this embodiment, only master 4 has knowledge of the position of each slave 6, 8, 10 in ring-shaped communications arrangement 2.

In one embodiment of the present invention, a participant or node of the ring-topology communications arrangement provided as a slave 6, 8, 10 is formed in such a manner that each slave 6, 8, 10 modifies an address value of a received address, typically an address value in an address field of a data frame provided for passing a message to at least one slave, by a fixed value and forwards it to the next participant. In that operation, the address value may, for example, be subtracted by the fixed value "1". Such an alteration of an address value may in embodiment also be performed for other data packets, this also being possible when such data packets do not include a data frame, but include only an empty frame with a message.

An encoding method for recovering timing information from a data signal of a data packet is carried out in such a manner that, by equidistant insertion of a parity bit, it is ensured that at least one edge change is present in bit stream 26 within a specified period of time. By continuous data transmission it is possible to ensure synchronization of slaves 6, 8, 10 in communications arrangement 2. It is also possible for other suitable encoding methods to be applied.

The data packet is passed from master 4 to first slave 6 and in succession from slave 6 to slave 8 as far as last slave 10 and from last slave 10 to master 4. The data packet accordingly passes through all the participants of communications arrangement 2. The data frame with which a message is to be passed to at least one slave 6, 8, 10 has an address field with an address. It is provided that each slave alters an address value of the received data frame containing the message to be transmitted by a fixed value, for example by subtraction or addition, and forwards it to the next participant. In that operation, the address value is altered by each slave in the same manner, depending on the algorithm specified for this. Within the communications arrangement 2 shown, slaves 6, 8, 10 have identical local addresses. In addition, an identical algorithm for the communications interface is stored in all the slaves. Typically, only the module for inter-chip communication is identical and otherwise the participants may very well include different functions.

The data frames and empty frames described below are merely illustrative embodiments. It is possible to position further bits between the data blocks or also to transpose the arrangement of the blocks within a data frame.

Figure 2:
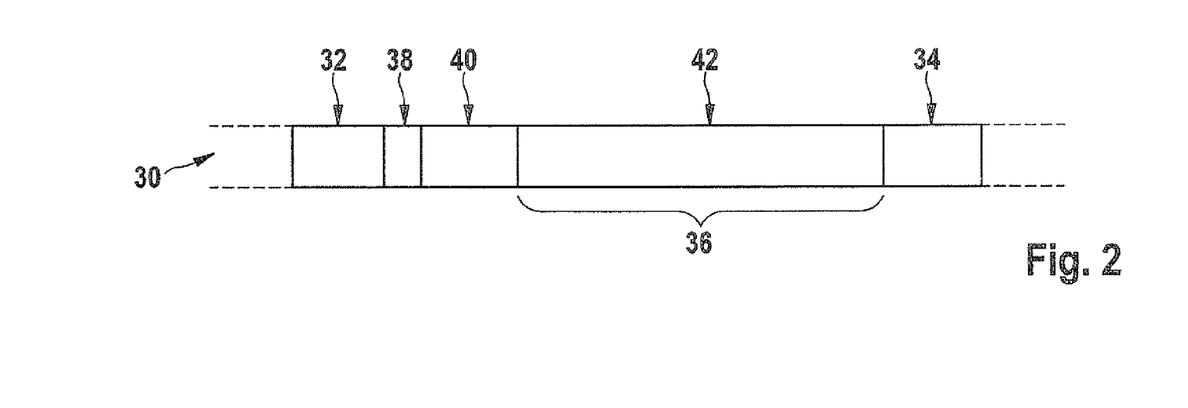
FIG. 2 shows a schematic illustration of an example of a structure of a data packet with a data frame as used in one embodiment of the method according to the present invention.

An example of a data packet 30 shown in FIG. 2, which is transmitted in one embodiment of the method according to the present invention, includes at a start a first inter-frame symbol (IFS) 32 and at the end a second inter-frame symbol 34. Between those two inter-frame symbols 32, 34, which are typically identical, a data frame 36 is arranged within data packet 30. At the start of data frame 36, it has immediately after first inter-frame symbol 32 a reservation flag 38 which provides information on the type of data packet 30 in circulation. In FIG. 2, it is provided in embodiment that reservation flag 38 has, for example, the value "0" and therefore the frame is in the form of a data frame 36. After reservation flag 38, data frame 36 includes an address field with an address value for an address. Data frame 36 further includes an actual message 42 which may include instructions and data, in the form of useful data in this case, and also further checksums and parity bits.

Figure 3A:
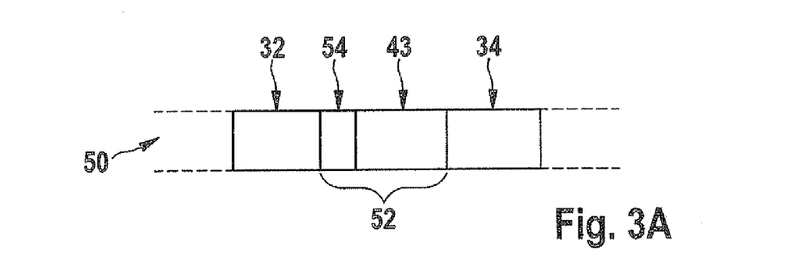
FIG. 3 shows examples of data packets with empty frames as used in various embodiments of the method according to the present invention.

FIG. 3a is a schematic illustration of a further example of a data packet 50, which in this case has a first variant of a frame in the form of an empty frame 52. That data packet 50 also starts with a first inter-frame symbol 32 and ends with a second inter-frame symbol 34. Between the two inter-frame symbols 32, 34, there is an empty frame 52 in which, in contrast to first data packet 30 with data frame 36, a reservation flag 54 has the value "1" and thus classifies the frame as an empty frame 52. In addition, that empty frame 52 also includes an address field 43 with an address value. The embodiment of empty frame 52 shown here and hence data packet 50 does not, however, have a message and therefore has no useful data.

Using data packets 50 illustrated in FIG. 3a, the master continuously sends empty frames 52 to the slaves to carry out polling. Each slave may insert data into such a data packet 50 and/or send at least one request (soft interrupt) to the master. This is typically done in a form such that the slave inverts reservation flag 54, usually a reservation bit, and sets the address value to "111 . . . 1". By activation of reservation flag 54, the frame is then blocked for the subsequent participants analogously to a data frame. Each subsequent participant also modifies the address value by a fixed data value, analogously to the procedure in the case of a data frame of FIG. 2. Data packet 50 is consequently passed on through to the master, the master being able to calculate back, by reference to the address information, which slave has made an interrupt request.

Figure 3B:
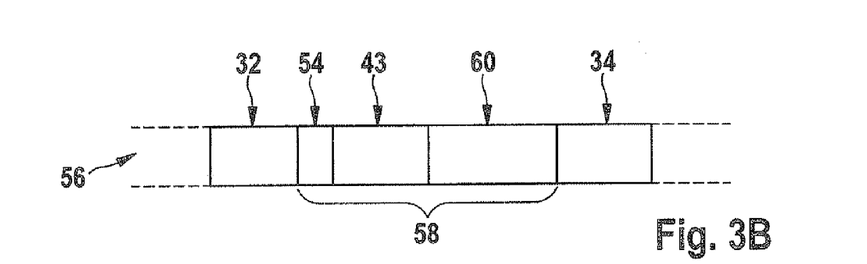

The third example of a data packet 56 illustrated schematically in FIG. 3b also includes a first inter-frame symbol 32 and, at the end, a second inter-frame symbol 34. That data packet 56 further includes a frame, which in this case is in the form of a second variant of an empty frame 58. That empty frame 58 includes a reservation flag 54 with the value "1" which defines that frame as an empty frame 58. Empty frame 58 further includes an address field 43 with an address and also a message 60 which in this case includes data in the form of useful data.

That empty frame 58 may be filled by a slave with data for passing information to the master, in which case reservation flag 54 is set. The address value of an address of address field 43 in empty frame 58 is set to a maximum value "111 . . . 1". This may be done in such a manner that the address value in empty frame 58 is set by the slave to "111 . . . 1" and passed to the master by subtraction or addition of the address in the address field of the data frame in every subsequent slave. Setting of the address to the value "111 . . . 1" may, for example, be performed by an OR operation by overwriting all address bits with a "1", it being possible for address field 43 of empty frame 58 to contain random data. Via the message, direct transmission of useful data not exceeding a data length defined by empty frame 58 is made possible for the slave. The number of modifications carried out on the set address value of the address corresponds to the number of subsequent slaves. Thus, the master is able to determine which slave has filled empty frame 58 with data and re-set address field 43.

Figure 3C:
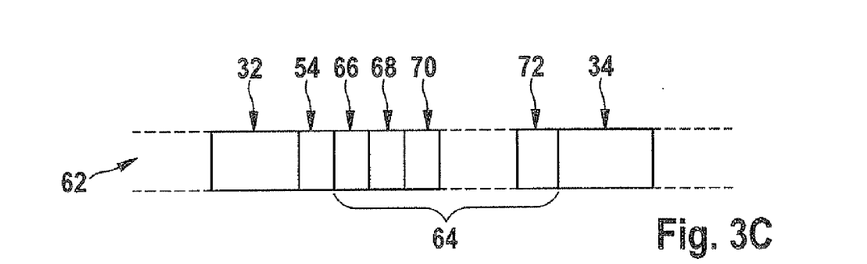

The fourth example of a data packet 62 shown in FIG. 3c includes, in addition to first inter-frame symbol 32 and second inter-frame symbol 34, a frame in the form of an empty frame 64, which in this case is in the form of a third variant of an empty frame 64. In this case also, the type of frame is defined as an empty frame 64 by a reservation flag 54, which in this case has the value "1". Empty frame 64 further includes as a further bit a first interrupt bit 66, which is allocated to a first slave, a second interrupt bit 68, which is allocated to a second slave, a third interrupt bit 70, which is allocated to a third slave, and an n-th interrupt bit 72, which is assigned to an n-th slave.

Accordingly, in data packet 62, the bit provided as interrupt bit 66, 68, 70 follows inter-frame symbol 32 and reservation flag 54 for every slave of the communications arrangement. If an interrupt is to be triggered by a slave, that slave triggers interrupt bit 66, 68, 70, 72 allocated to it. In this configuration, a sequence of interrupt bits 66, 68, 70, 72 corresponds to a sequence of slaves along the communications arrangement, but the sequence of the interrupt bits does not necessarily have to be tied to the sequence along the communications arrangement.

Figure 3D:
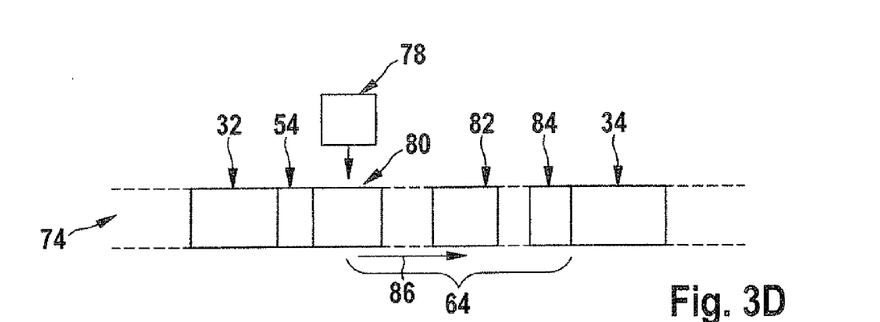

The embodiment shown in FIG. 3d for a fifth example of a data packet 74 also begins with a first inter-frame symbol 32 and ends with a second inter-frame symbol 34. The data packet also includes a reservation flag 54, which in this case has a value "1", which defines a frame of that data packet 74 as an empty frame 76. In addition, empty frame 76 includes as further bits a variable number of interrupt bits 80, 82, 84, more specifically an n–1-th interrupt bit 80 for an n–1-th slave and a first interrupt bit 82 for a first slave of a communications arrangement. FIG. 3d also shows an additional n-th interrupt bit 78 to be inserted for an n th slave. This variant of the empty frame further includes an x-th interrupt bit 84.

A shifting of interrupt bits 80, 82, 84 within empty frame 76 after insertion of n-th interrupt bit 78 into empty frame 76 by an n-th slave is indicated here by arrow 86. Thus, within empty frame 76, a sequence of interrupt bits 78, 80, 82, 84 after reservation flag 54 may be shifted by one position by every slave and a new interrupt bit 78 may be inserted by every slave. Empty frame 76 that was originally sent by the master does not include useful data. A number of provided interrupt bits 78, 80, 82, 84 is greater than or equal to the number of interrupt-capable slaves in the communications arrangement. If an interrupt is to be triggered, it may be set by n-th interrupt bit 78 inserted by the n-th slave. If no interrupt is to be triggered, a bit is also inserted, but it is not then set. The number of interrupt bits provided could in principle be smaller than the number of slaves in the communications arrangement, but then not every slave is capable of setting an interrupt bit. In that case, the communications modules of the connected slaves must be designed differently or at least configured differently, which is not an optimal solution.

The embodiments shown in FIGS. 2, 3a and 3b for data packets 30, 50, 56 each have an address field 40, 43 via the structure of which, usually a structure of the address value, a data packet 30, 50, 56 may be addressed by master 4 to an i-th slave 6, 8, 10 or by i-th slave 6, 8, 10 to master 4 of the embodiment of communications arrangement 2 illustrated in FIG. 1.

The mentioned structure of address field 40, 43 has in one configuration N bits. The maximum binary numeric value capable of being represented by the N bits must be greater than or equal to the number of participants, typically greater than or equal to the number n of slaves 6, 8, 10. In one embodiment of the method according to the present invention, it is provided that a sent data packet 30, 50, 56 is directed to the i-th slave 6, 8, 10, the address field being provided by master 4 with the binary number i.

That data packet 30, 50, 56 is sent by master 4 to slaves 6, 8, 10, each slave 6, 8, 10 up to the i-th slave 6, 8, 10 through which the data packet passes modifying the address value in the address field of the data frame by a fixed value, for example by the value "1", for example by subtraction. If no overflow occurs on subtraction, the address value was other than "00 . . . 0" and it is thereby signaled to slave 6, 8, 10 performing the examination that data packet 30, 50, 56 is not intended for it. As soon as i th slave 6, 8, 10 is reached, the mentioned overflow occurs and i-th slave 6, 8, 10 recognizes that the received data frame may be processed, that is to say, as a rule that the contents of data packet 30, 50, 56, for example a message 42, 60, are intended for that i-th slave 6, 8, 10.

In an alternative configuration of the interface, the address value has in one configuration n bits. Thus, one bit of the address value is provided for each of the n slaves 6, 8, 10. If it is provided in one embodiment of the method according to the present invention that a sent data packet 30, 50, 56 is directed to i-th slave 6, 8, 10, the i-th least significant bits of the address value are set in each case by master 4, and n–i-th most significant bits are not set. Alternatively, the i-th most significant bits may be set and the n–i-th least significant bits not set.

That data packet 30, 50, 56 is sent by master 4 to slaves 6, 8, 10, each slave 6, 8, 10 up to i-th slave 6, 8, 10 through which data packet 30, 50, 56 passes clearing and thus modifying a set bit in each case. When data frame 36 arrives at i-th slave 6, 8, 10, all the bits are cleared, that is, not set, and thus it is signaled to i-th slave 6, 8, 10 that data packet 30, 50, 56, as a rule the contents of data packet 30, 50, 56, for example a message 42, 60, are intended for that i-th slave 6, 8, 10.

Accordingly, i-th slave 6, 8, 10 for which data packet 30, 50, 56 is provided or intended produces an overflow for the address value. The overflow and/or an address value structure produced by the overflow signals to i-th slave 6, 8, 10 that data packet 30, 50, 56 is directed to it. Before forwarding of data packet 30, 50, 56 to a subsequent participant of the communications arrangement, that is, to at least one slave 6, 8, 10 or, where applicable, to master 4, all N bits of the address value of address field 40, 43 are set by that i-th slave 6, 8, 10 to the same value, for example all bits are set to "1" or all bits are set to "0". The subsequent n–i slaves 6, 8, 10 modify the re-set address value of address field 40, 43 in exactly the same way as the other i slaves 6, 8, 10 that have already received data packet 30, 50, 56. Thus, the re-set address value is modified n–i times. Master 4, which receives that data packet 30, 50, 56 again, is able to recognize on the basis of the structure of the address value, that is, on the basis of the number of modified bits, that the address value has been modified n–i times. That indicates to master 4 that data packet 30, 50, 56 has been processed by i-th slave 6, 8, 10.

If an i-th slave 6, 8, 10 provides an empty frame 52, 58 of data packet 50, 56 with information for master 4, that i-th slave 6, 8, 10 also re-sets the address value of address field 43. In this case also, as soon as master 4 receives data packet 50, 56 with the information provided for it, it is able to recognize on the basis of the structure of the address value that the data packet was modified by the n–i subsequent slaves 6, 8, 10 n–i times and that the information originates from i-th slave 6, 8, 10.

Reservation flag 38, 54, which may also be referred to as a token, defines whether a data packet 30, 50, 56, 62, 74 has a data frame 36 (reservation flag="0") or an empty frame 52, 58, 64, 76 (reservation flag="1"). Depending on definition, the bit value of reservation flag 38, 54 may also be reversed. It is possible to regard a set or not set reservation flag 38, 54 as an allocated or free reservation flag, respectively.

Communication arrangement 2 of FIG. 1 may be formed in a motor vehicle for transmission of data packets 30, 50, 56, 62, 74 between a microcontroller and ASICs in a control unit of the motor vehicle, the control unit having the participants of communications arrangement 2.

A protocol for priority control of the communications arrangement is such that each slave is able to transmit a request (soft interrupt) to the master, which is described herein with reference to FIGS. 3a, 3b, 3c and 3d. Thus, an identical algorithm of the communications interface is stored in each slave and the master is able, on the basis of knowledge of the position of the participants in the form of slaves, to attribute the interrupts accordingly and, in the case of the possible transmission of a plurality of interrupt requests in one data packet as shown in FIGS. 3c and 3d, is able to process the interrupts in accordance with a desired prioritization. With a protocol for priority control it is possible for a request to be transmitted to the master from at least one slave using a data packet including an empty frame.

Encoding for recovery of timing information from a signal may be carried out in such a manner that a parity bit is inserted equidistantly in the data frame, so that the transmitted bit stream has at least one edge change within a specified period of time.

In order that information may be received from the slaves in the idle state of the master, the master continuously sends empty frames in order to carry out polling of the slaves. Each slave may provide an empty frame with data and transmit those data and/or at least a request in the form of what is commonly referred to as a "soft interrupt" and thus a software interrupt, for example of a second-level interrupt handler (SLIH), that is, a control program for interrupting a second layer in accordance with the OSI layer model, to the master as a response to the polling.

Figure 4:
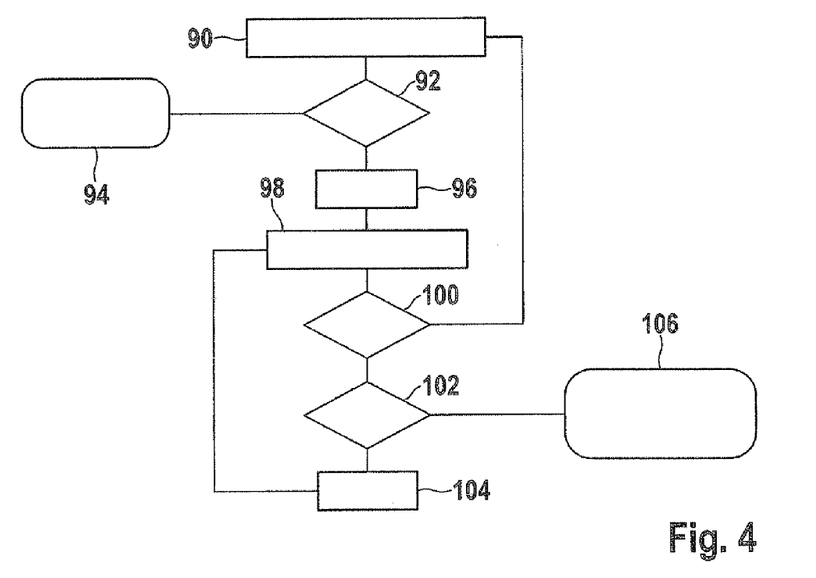
FIG. 4 shows a flow diagram relating to a further embodiment of the method according to the present invention, wherein processing of an addressing of a slave takes place.

The flow diagram shown in FIG. 4 shows an example of processing of an address value of an address in the address field of a data frame which is sent by a master, through n slaves as participants within a communications arrangement, for example a ring-shaped communications arrangement, in a further embodiment of the method according to the present invention. In this case, implementation of addressing takes place during the data transmission within each slave in the ring.

In addition, receipt of an incoming data packet is detected by a detection 90 of the inter-frame symbol. Thereafter a check 92 checks whether a reservation flag of a frame of the data packet has either the value 0 or the value 1.

If the reservation flag is not set, the received data packet includes a variant of an empty frame. In that case, an interrupt 94 and thus a request and/or an inquiry to the master may, if required, be triggered by an i-th slave. Thus, the i-th slave is given the opportunity to provide the received data packet with a message which is forwarded to the master.

Alternatively, the reservation flag is set, and therefore the data packet includes a data frame. In that case, processing or modification of the address field takes place. This address value ADDR [1 . . . N] has in this configuration N bits or places. In this instance, the maximum binary number consisting of N bits corresponds to the number n of slaves in the communications arrangement.

To modify the address field, in step 96 a variable i is provided with the value "1".

Thereafter, inversion 98 of the first address bit ADDR[1] of the address field ADDR [1 . . . N] of a received data frame takes place. Owing to the address being transmitted with the beginning of the least significant bit, inversion of ADDR[1] corresponds to the subtraction of "1" from the address value.

In next step 100 of the processing, the result of inversion 98 to the value "1" is checked. If the value ADDR[1] is not "1", that is, if the value is "0", no overflow occurred upon subtraction. In that case, the slave forwards the data packet with the now modified address to the next i+1-th slave. Since no processing is further required by the slave, in accordance with the method it waits for the new detection 90 of an inter-frame symbol and forwards unchanged the bits that have meanwhile been received.

If it is found in the check in step 100 that ADDR[1] has the value "1", an overflow occurred upon subtraction. The slave then has to check in step 102 whether the complete address field of length N has already been run through. If that is not the case, the variable i is incremented by the value "1" (step 104). Then, inversion 98 of the next higher significant bit takes place.

The loop is repeated for the subsequent bits of the address field until an inverted address bit provides a "0". If no overflow has then occurred, that is, if the complete address field has not yet been run through, it is signaled to the slave that the received data packet was not intended for it and the slave branches back to step 90 and waits for the next incoming inter-frame symbol in order to proceed with possible processing of the next data packet. If, however, an overflow occurs and all positions of the address field are therefore set, that is, have a "11 . . . 1", that signals to the slave that the data packet is intended for it and has to be processed by it. In that case, the polling in step 102 takes effect, according to which the variable i then corresponds to the value 2N−1 (maximum representable value of N bits), according to which all bits of the address field have now been inverted. The result of the evaluation of the address field is step 106 in which it is ascertained that the frame of received data packet 30 is a data frame 36 and is intended for the i-th slave receiving that data frame 36 within data packet 30. Subsequently, evaluation of the instructions within message 42 and processing of the data of message 42 are carried out by the i th slave.

The steps shown in the flow diagram may be carried out, for example, by a counter, an inverter and with comparators as components of an interface of a slave and/or of the slave. In the illustrated embodiment of the method, the subtrahend was set with "1". Other ways of implementing subtraction or addition and thus other ways of modifying the address with other fixed values are usually also possible.

Figure 5:
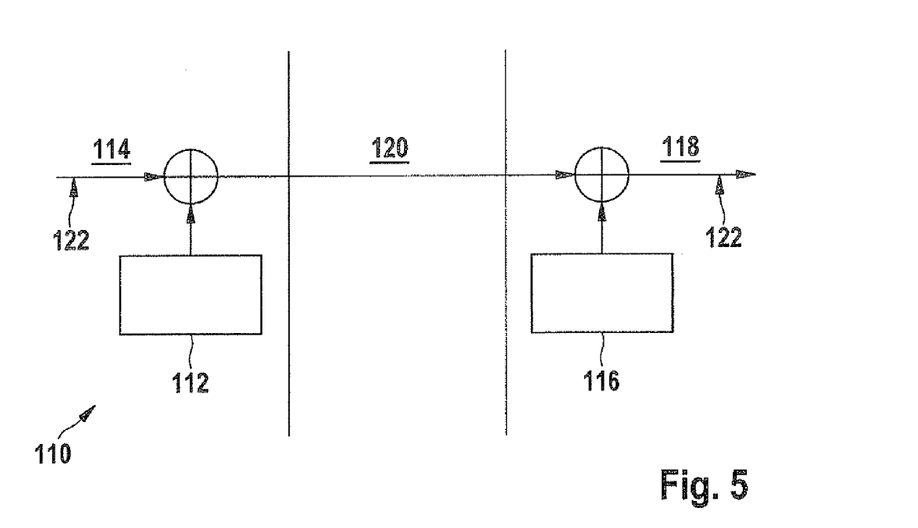
FIG. 5 shows schematically a block diagram of a block-synchronized scrambler as used in a further embodiment of the method according to the present invention.

FIG. 5 shows a block diagram for an embodiment of a block-synchronized scrambler 110. Scrambler 110 includes a first m-sequence generator 112 which is arranged in master 114 (μC) as sending participant, and n m-sequence generators 116, only an i-th m-sequence generator in an i-th slave 118 (ASIC) being illustrated here. Between master 114 and the n slaves 118, an encoded transmission 120 of data packets takes place within a bit stream 122. In this case, transmission path 120 may contain further participants. Furthermore, it is also possible that, in each slave, the message is first decoded by an m-sequence generator 116 and then re-encoded with a further, possibly different, m-sequence generator 112, that is to say, transmission path 120 between two participants is encoded in each case. In that case, transmission path 120 does not contain further participants. Furthermore, it is also possible that only selected parts of the bit stream, typically the useful data, are scrambled.

In addition to the possibilities of spectral spreading already mentioned, there is also the option of using block-synchronized scrambler 110. In the case of block-synchronized scrambler 110, the same m-sequence is simultaneously modulo-2-added to the data in the sending participant, in this case master 114, and to the receiving participant, in this case i-th slave 118, and accordingly 2 is added to a remainder of a division.

Usually, during synchronization of the m-sequences of block-synchronized scramblers 110 in a sending and a receiving participant in the case of a continuous bit stream, sequence errors may occur over all the messages. To remedy this, synchronization by the inter-frame symbol is used within the scope of the exemplary embodiments and/or exemplary methods of the present invention. In one configuration of block-synchronized scrambler 110 it is provided that the bit stream of the data packets does not correspond to the m sequence. It is furthermore possible to allow for no inter-frame symbols to be generated at the output of the modulo- 2-addition of the bit stream with the m-sequence. Using that encoding method, it is also possible to encode the frames, usually empty frames, to individual participants while other participants, possibly inexpensive participants or participants having small frame lengths, include no encoding for spectral spreading. A combination of diverse encoding methods is also possible.

Using the method, in an embodiment of the invention transmission of data between participants of a serial, ring-shaped communications arrangement 2 is possible. In that communications arrangement 2, the participants are serially connected to one another, a data packet 30, 50, 56, 62, 74 being passed from a participant provided as master 4 to further participants provided as slaves 6, 8, 10, data packet 30, 50, 56, 62, 74 being passed from slave 6, 8, 10 to slave 6, 8, 10. Contents of data packet 30, 50, 56, 62, 74 include address information. That address information may be arranged in an address field 40, 43 of data packet 30, 50, 56, 62, 74 and may be in the form of an address value. In embodiment of the method, the address value and hence the address information of received data packet 30, 50, 56, 62, 74 is altered, for example, by a fixed value by each slave 6, 8, 10.

It is provided in this case that the address field 40, 43 may be in any desired position within a data packet 30, 50, 56, 62, 74. Accordingly, modification of a data packet 30, 50, 56, 62, 74 is carried out by a slave 6, 8, 10. Each slave 6, 8, 10 alters an address value and hence the address information within a data packet 30, 50, 56, 62, 74 in the same manner, the same mathematical operation, usually addition or subtraction, being carried out by each slave 6, 8, 10. In addition, in an exemplary embodiment of the present invention, all slaves 6, 8, 10 have the same, identical address.

What is claimed is:

1. A method for transmitting data between participants of a serial, ring-shaped communications arrangement, in which the participants are serially connected to one another, the method comprising:
    passing a data packet from a participant provided as a master to further participants provided as slaves, wherein the data packet is passed from one of the slaves to another of the slaves; and
    transmitting the data packet through the ring-shaped communications arrangement with a latency time of 1 bit duration per slave;
    wherein a protocol for priority control is provided with which at least one slave transmits a request to the master via a data packet including an empty frame.

2. The method of claim 1, wherein the slaves have identical local addresses, and wherein an identical algorithm for communication is stored in each of the slaves.

3. The method of claim 1, wherein encoding for recovery of timing information from a signal is used for a data packet that is to be transmitted, wherein a parity bit is inserted equidistantly in the data frame by that encoding, so that a bit stream for transmission of data packets has at least one edge change within a specified period of time.

4. The method of claim 1, wherein the data are transmitted continuously, and wherein the data packet includes with an address field useful data provided for a slave.

5. A communications arrangement, which has a ring-shaped configuration, comprising:
    a plurality of participants which are serially connected to one another, wherein one of the participants is a master and other ones of the participants are slaves;
    wherein the master is configured to pass the data packet to the slaves, each of the slaves passing the data packet to a subsequent one of the slaves,
    wherein a protocol for priority control is provided with which at least one slave transmits a request to the master via a data packet including an empty frame; and
    wherein the data packet is configured to transmit through the ring-shaped communications arrangement with a latency time of 1 bit duration per slave.

6. The communications arrangement of claim 5, wherein each participant has at least one serial interface with which the participant is connected via a communications connection having a serial interface to an adjacent participant of the communications arrangement.

7. The method of claim 1, wherein, as address information, an address value of the received data packet is altered by one of adding and subtracting a fixed value by each slave.

* * * * *